July 10, 1945.  T. W. SMITH, JR  2,380,370
INFLATABLE ATHLETIC BALL AND METHOD OF MAKING SAME
Filed April 2, 1945  2 Sheets-Sheet 1
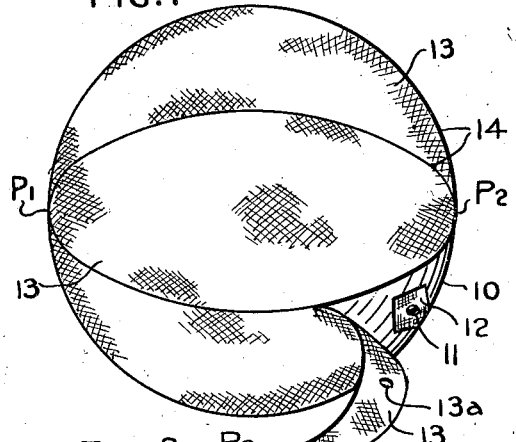
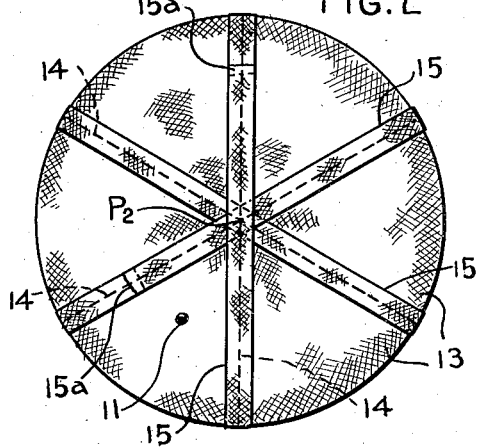
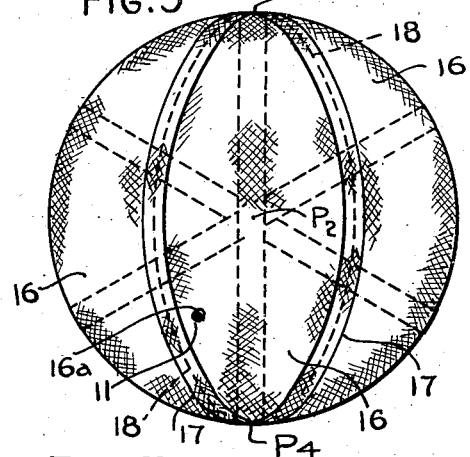
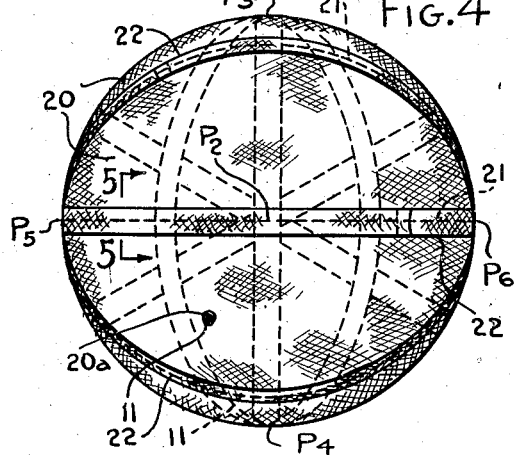
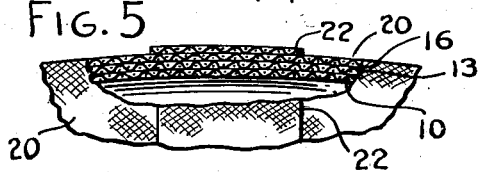
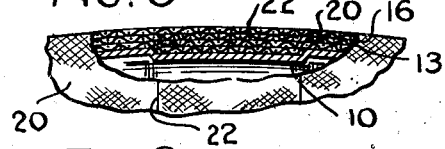
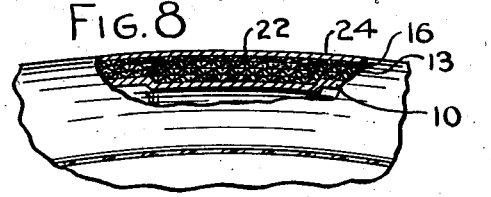
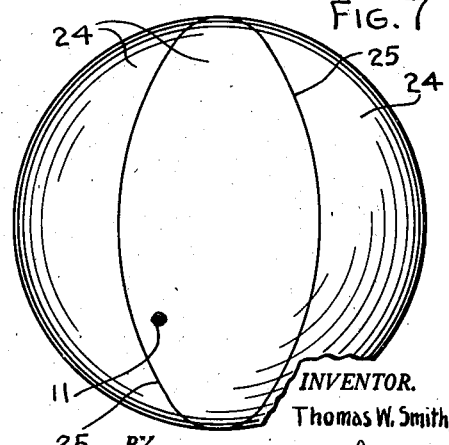
INVENTOR.
Thomas W. Smith, Jr
BY William Cleland
Attorney Patented July 10, 1945

2,380,370

UNITED STATES PATENT OFFICE 2,380,370

INFLATABLE ATHLETIC BALL AND METHOD OF MAKING SAME

Thomas W. Smith, Jr., Akron, Ohio, assignor to The Sun Rubber Company, Barberton, Ohio, a corporation of Ohio Application April 2, 1945, Serial No. 586,131

20 Claims. (Cl. 273—65)

This invention relates to inflatable athletic balls and to a method of making the same.

Heretofore, athletic or like inflatable playing balls have been produced, the same comprising an inner inflatable rubber bladder, an intermediate wall of rubberized fabric layers, and an outer cover of rubber or leather bonded to the intermediate wall, the rubber bladder in some instances being cemented or otherwise bonded to the intermediate wall. Difficulties have been encountered with known prior art balls of this type in that, for example, rubberized sheet material forming the intermediate wall has had a tendency to stretch under internal pressure of the ball, even after vulcanization thereof in a mold, so that such balls would "grow" or become oversize. This fault has occurred whether or not prestretched fabric was used for the reinforcing layers. In certain prior art structures attempts have been made to reinforce balls at the expense of making them off balance in flight or when bounced, or have attempted to preserve balance at the expense of weakening the ball, increasing the cost of manufacture, or obtaining some other undesirable feature.

An object of this invention is to provide an athletic ball of the character described which will retain its true spherical shape when properly inflated, and to a maximum extent when over-inflated.

Another object of the invention is to provide an athletic ball of the character described which is relatively simple and economical to manufacture, and yet which will be of durable construction, and well balanced in flight or when bounced.

Another object of the invention is to provide an athletic ball, having improved means incorporated therein whereby it will have combined advantages of a ball having a minimum number of fabric reinforcing plies with reference to economy of construction, and of one having a relatively greater number of fabric reinforcing plies with particular reference to durability and ability to retain shape.

Still another object of the invention is to provide an improved method of making inflatable athletic balls having the features set forth above.

Other objects of the invention will be manifest from the following brief description and the accompanying drawings.

Of the accompanying drawings:

Figure 1 is a side elevation of an athletic ball in process of manufacture, and illustrating the application of a first layer of fabric material to a rubber bladder.

Figure 2 is an end elevation of the same, as viewed from the right of Figure 1, but after reinforcing strips have been applied.

Figure 3 is an elevation of the ball in the same relative position illustrated in Figure 2, but after a second layer of fabric and reinforcing strips have been applied.

Figure 4 is an elevation of the ball in the same relative position illustrated in Figures 2 and 3, but after a third layer of fabric material and reinforcing strips have been applied.

Figure 5 is a greatly enlarged fragmentary view, partly broken away and in section, taken at a point substantially on line 5—5 of Figure 4.

Figure 6 is a view corresponding to Figure 5, illustrating the condition of the ball after a vulcanizing step.

Figure 7 is an elevational view of the ball after application of a layer of unvulcanized rubber.

Figure 8 is a view corresponding to Figures 5 and 6, but illustrating the ball subsequent to another vulcanizing step in which the rubber cover is bonded thereto.

Figure 9:
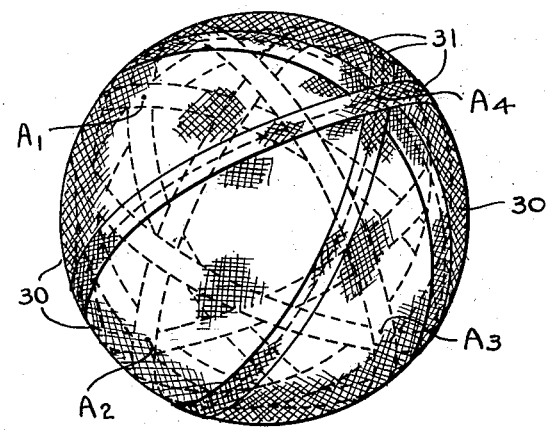
Figure 9 is a view corresponding to Figure 4, but illustrating a partially completed ball having four plies of reinforcing fabric.

The present invention will be best understood by means of a brief description of the improved procedure for producing athletic balls. Accordingly, referring particularly to Figure 1 of the drawings, there may be provided an inflatable bladder or ball 10, which preferably is of rubber like material and which has been vulcanized in a mold to provide a smooth spherical outer surface thereon, suitable inflating valve means (not shown) being provided within the bladder as a permanent inflating device for the ball being built, and for inflating purposes in carrying out various steps during the ball building process. A stem portion of the valve or valve cap may be allowed to project outwardly of the bladder, as indicated at 11.

After inflating the bladder to predetermined spherical size slightly smaller than the completed ball, it is dipped in rubber cement or other bonding material which is allowed to dry or set. A small patch 12 of rubberized fabric is applied to the bladder to reinforce the same in the valve area thereof. Next, a plurality of "orange-peel" or spheroid-shaped segments 13, six being shown, of rubberized fabric may be applied to the bladder, with adjacent edges thereof abutting, the fabric preferably being bias-cut, square-woven stock so that the segments will readily conform to spherical shape with a minimum of handwork. The first segment applied to the bladder may have a hole $13a$ pre-punched therein in predetermined location, substantially as shown, to facilitate predetermined location of subsequently applied fabric piles with reference to all of the plies. In utilizing six spheroid-shaped segments 13 for this first fabric ply the abutting edges thereof define three great circles, as indicated at 14, which intersect each other at oppositely disposed poles $P_1$ and $P_2$ of the ball. A greater or lesser number of segments may be similarly applied in accordance with the required size of the ball, the number of fabric plies, or other considerations.

Referring to Figure 2, which for convenience of illustration is an end elevation of Figure 1 as viewed from the right thereof, relatively narrow strips 15 of rubberized fabric may be applied over the abutting edge portions 14 of the segments 13, each strip being a single length adapted to extend in a great circle around the ball, and the ends thereof being adhesively overlapped as indicated at $15a$. Thus the strips 15 also intersect at the poles $P_1$ and $P_2$.

In Figure 3 is illustrated the ball in the same relative position shown in Figure 2, but with a second ply of similar rubberized fabric segments 16 applied to overlap segments 13 of the first ply in such a manner that the great circles defined by the abutting edges intersect at opposite poles indicated at $P_3$ and $P_4$, the polar axis of which is at right angles to the polar axis of poles $P_1$ and $P_2$. To this end the first segment 16 to be applied is provided with a prelocated aperture at $16a$ so that the building operator may locate this first segment in predetermined manner, by receiving valve projection 11 through aperture $16a$, and longitudinally aligning the segment along the nearest strip 15 while centering it on pole $P_2$. When the segments 16 are in place, three strips of rubberized woven fabric 17 may be applied over the abutting edge portions 18 with the ends of the strips overlapped as before.

Figure 4 illustrates the ball in the same relative position as shown in Figures 2 and 3, but with a third layer of six spheroid-shaped segments 20 of bias-cut rubberized fabric applied. As before the segments may be abutted at 21, and the abutting edge portions reinforced with three narrow rubberized fabric strips 22, like strips 15 and 17, the segments being arranged so that the strips 22 will extend in great circles around the ball with intersecting portions thereof at poles $P_5$ and $P_6$, the polar axis thereof being at right angles to the other two polar axes. These segments 20 are predeterminately located with respect to the segments of the first and second plies, although the first ply is completely covered by the second, by the building operator receiving valve projection 11 through a prelocated aperture $20a$ in the first segment 20 applied, and aligning one edge thereof with the minor axis of the apertured segment 16 of the second ply.

In the foregoing manner the segments of successive plies or layers are definitely arranged with the respective polar axes thereof at right angles to each other and intersecting at the center of the ball, and at no point will there be a reinforcing strip of one ply of segments closely paralleling that of another layer. Furthermore, it will be seen by reference to the various views that the reinforcing strips of the three layers will provide a definite network or pattern of interconnecting reinforcing members which is identical around each of the six polar areas, indicated at $P_1$, $P_2$, $P_3$, $P_4$, $P_5$, and $P_6$. This network of ball-encircling strips retains the ball in true spherical form without adding materially to the weight thereof, and at the same time the strips effectively reinforce the segments at the abutting edge portions thereof.

The uncompleted ball shown in Figures 4 and 5 is next placed in a mold having a smooth-surfaced forming cavity, and is vulcanized therein under suitable internal pressure applied through said valve means to provide a smooth, perfectly spherical outer surface, as illustrated in Figure 6, the reinforcing strips thereby being bonded into the wall of the ball in this condition, by flow of rubber which becomes set or hardened due to vulcanization.

After the last-mentioned vulcanizing step the unfinished ball is coated with rubber cement, or other suitable adhesive or bonding material. For this purpose it may be desirable that the outer ply of fabric segments should be rubber-coated only on the inner side so that the cement applied on the outer side will more effectively adhere to the fabric. When the cement has become sufficiently set or dried spheroid-shaped segments 24 of unvulcanized rubber are applied with the edges thereof abutting, as indicated at 25, completely to cover the spherical outer surface of the ball (see Figure 7), after which it is vulcanized in a mold (not shown) under heat and internal pressure to bond the cover to the ball. Suitable design configurations are provided on the mold cavity surface whereby the completed ball will have a surface design simulating that of a sewn leather-covered ball (see Figure 8).

While the strips 15, 17 and 22 may be of square-woven, square-cut fabric stock, effectively to retain the ball against inflation pressure thereof, it has been found that when bias-cut, square-woven fabric is used very satisfactory results are attained with respect to uniformity in spherical shape of the ball at normal inflation pressure, as well as above and below normal pressure to a substantial extent. That is, the bias-cut strips expand and contract under inflation of the ball at different pressures to a certain extent in the same manner as the bias-cut fabric of the segments, and substantially as though the fabric wall were an integral uniform structure, resisting stresses uniformly in all directions around the ball. The circumferential binding action of the reinforcing strips, however, is effective to maintain the true spherical shape of the ball, and should the ball for some reason become overinflated or oversized there will be no material distortion at the seam portions, either inwardly or outwardly.

Referring now to Figure 9, there is illustrated a partially completed ball similar to that shown in Figure 4, the ball, however, having four fabric reinforcing plies in place of three. A first ply of fabric segments 30 is applied to a bladder and narrow reinforcing strips 31 are then applied over the abutting edges of the segments to extend in a series of three great circles in the manner previously described in connection with Figure 2. The relative arrangements of the fabric segments and reinforcing strips of the first plies of the structures shown in Figures 2 and 9 are the same, the ball of Figure 9, however, having the axis $A_1$, through the poles at the apexes of the segments, as shown for clear understanding of the four ply ball construction. Second, third and fourth reinforcing plies of bias-cut, rubberized fabric are similarly applied, these plies also comprising abutting spheroid-shaped segments 30, and each ply having the abutting edges reinforced by narrow strips 31 of bias-cut, rubberized fabric or the like, as previously described.

The segments of the respective plies are applied as shown so that the four polar axes A1, A2, A3 and A4 thereof, intersecting at the center of the ball, will be at equal angles to each other. That is, the eight polar points will be equidistant from each other on the surface of the ball, with the axes A1, A2, A3 and A4 passing through diametrically oppositely disposed polar points. In this manner the separate layers of segments may be arranged in crossed relation whereby the superposed seam portions will not substantially parallel each other at any point, and whereby the reinforcing strips 31 will be in crossed relation to provide substantially uniformly reinforced structure throughout the ball casing. Also, as in the case of the ball of Figure 4, like patterns or networks of interconnecting reinforcing strips are provided at each polar area, so that the four ply ball produced in the manner described will have substantial uniformity with regard to flight and bouncing qualities, for example. It will be readily seen that the arrangement of the four successive plies of fabric segments may be otherwise than as shown, the pattern of the uniform network of reinforcing strips about the polar areas, however, being correspondingly affected. The ball may be completed with a rubber cover thereon in the manner previously described.

From the foregoing it will be understood that the improved method is applicable to ball structures having any number of strip-reinforced fabric plies.

Figure 10:
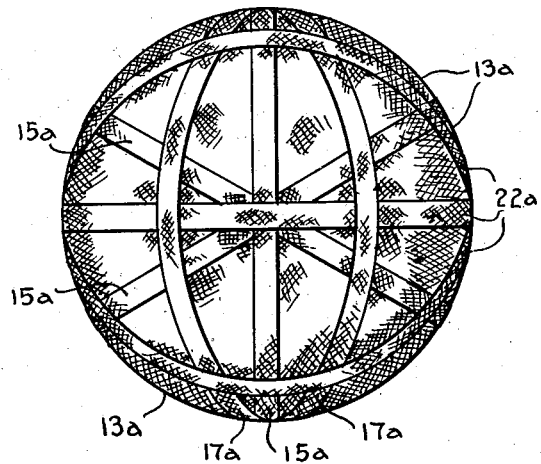
Figure 10 is a view coresponding to Figure 2, but illustrating a method of applying reinforcing strips to a ball having only one ply of reinforcing fabric.

Referring to Figure 10 there is shown a ball designed to have the advantages of the economy of construction of a one fabric-ply ball and yet to have certain qualities of a multiple fabric-ply ball, with reference to durability, the ability to retain spherical shape thereof, as well as other features previously described in connection with Figures 1 to 9.

In this form of the invention a single ply of fabric segments 13a is first built upon an inflated rubber bladder, with three strips of bias-cut fabric 15a over the abutting edges of the segments, substantially as previously described and as illustrated in Figure 2. Next, two series of three strips 17a and 22a are applied to the ball in the relative arrangements shown in Figures 3 and 4, respectively. Thus it will be seen that in Figure 10 the patterns of reinforcing strips at the poles will be relatively the same as the patterns of the strips in Figure 4. The ball thus reinforced may be first partially vulcanized, and then after cementing thereon a rubber or like cover it may be subjected to a final vulcanizing operation, fully described above.

In the foregoing manner a relatively inexpensive athletic ball may be provided which will have the combined qualities of lightness and durability of relatively more expensive types of balls at present on the market, as well as other desirable characteristics set forth in the stated objects. Obviously the invention is applicable to various types of hollow playing balls, such as volley-balls, footballs, basket-balls, etc. the size, weight, rebound etc., of which may be effectively controlled by varying the procedure set forth above.

Modifications of the invention may be resorted to without departing from the spirit thereof or the scope of the appended claims.

What is claimed is:

1. A method of making an inflatable athletic ball, which comprises forming an inflated hollow rubber body, applying a plurality of separate strips of rubberized fabric to said body to extend completely around the same to resist expansion thereof under inflation pressure, applying a cover of vulcanizable material, and vulcanizing the covered body in a mold.

2. A method of making an inflatable athletic ball, which comprises forming an inflated spherical body and applying strips of relatively inextensible rubberized fabric to extend completely around said body in great circles to resist substantial expansion of the body under inflation pressure thereof.

3. A method of making an inflatable athletic ball, which comprises forming an inflated spherical body and applying separate strips of relatively inextensible rubberized fabric to extend around said body in great circles to resist substantial expansion of the body under inflation pressure thereof, said strips being applied in crossed arrangement relative to each other to form similar patterns at oppositely disposed polar areas of the spherical body.

4. A method of making an inflatable athletic ball, which comprises forming an inflated spherical bladder, applying a plurality of plies of rubberized fabric to said bladder, applying strips of rubberized fabric over said plies to extend in great circles to resist expansion of the ball under inflation thereof, and vulcanizing the ball in a mold under internal pressure.

5. A method of making an inflatable athletic ball, which comprises forming an inflated spherical bladder, applying a ply of rubberized fabric to said bladder, and applying strips of rubberized fabric over said ply to extend in great circles to resist expansion of the ball under inflation thereof, and vulcanizing the ball in a mold under internal pressure, said strips being in crossed arrangement relative to each other to form similar patterns at oppositely disposed polar areas of the ball.

6. A method of making an inflatable athletic ball, which comprises forming an inflated spherical bladder, applying a plurality of plies of rubberized fabric to said bladder, applying strips of rubberized fabric over said plies to extend in great circles to resist expansion of the ball under inflation thereof, applying a cover of vulcanizable material to the ball, and vulcanizing the ball in a mold under internal pressure, said strips being in crossed arrangement relative to each other to form similar patterns at oppositely disposed polar areas of the ball.

7. A method of making an inflatable athletic ball, which comprises forming an inflated spherical casing, adhering spheroid-shaped segments of fabric material to said casing with the edges of the segments meeting and extending along great circles intersecting at opposite poles of the spherical casing, adhering square-cut strips of fabric over the meeting edges of said segments to extend around the ball, and bonding a rubber or like cover onto the ball.

8. A method of making an inflatable athletic ball, which comprises forming an inflated spherical bladder, adhering to the bladder successive overlapping plies each composed of spheroid-shaped segments of fabric material with the adjacent edges thereof in abutting relation and extending around the bladder in a series of great circles intersecting at opposite poles thereof, said successive plies being applied with polar axes thereof at angles to each other, and applying over each of said plies applied series of strips of fabric applied over said abutting edges thereof and extending around the ball in correspondingly intersecting great circles at the respective poles, said strips thereby forming similar patterns about the polar areas of the ball.

9. A method of making an inflatable athletic ball, which comprises forming an inflated spherical bladder, and adhering to the bladder successive plies each composed of spheroid-shaped segments of rubber or like impregnated bias-cut fabric with adjacent edges thereof in abutting relation and extending around the bladder substantially in great circles intersecting at oppositely disposed points, said successive plies being applied with polar axes thereof at angles to each other, and, applying over each of said plies series of strips of rubber or like impregnated fabric over said abutting edges and extending in series of great circles correspondingly intersecting at the respective oppositely disposed points, said strips thereby forming substantially similar patterns about said intersection points.

10. A method of making an inflatable athletic ball, which comprises forming an inflated spherical bladder, adhering to the bladder successive plies each composed of spheroid-shaped segments of rubber or like impregnated, bias-cut fabric with adjacent edges thereof in abutting relation and extending around the bladder in a series of great circles intersecting at opposite poles thereof, said successive plies being applied with polar axes thereof at angles to each other, and applying over each of said plies series of strips of rubber or like impregnated fabric over said abutting edges and extending in series of great circles correspondingly intersecting at the respective poles, said strips thereby forming substantially similar patterns about the polar areas of the ball and vulcanizing a rubber cover onto the fabric reinforced bladder.

11. A method of making an inflatable athletic ball, which comprises forming an inflated spherical bladder, adhering to the bladder successive plies each composed of spheroid-shaped segments of rubber or like impregnated, bias-cut fabric with adjacent edges of the segments in abutting relation and extending around the bladder substantially in great circles intersecting at opposite poles thereof, said successive plies being applied with polar axes thereof at angles to each other, and applying over each of said plies strips of rubber or like impregnated fabric over said abutting edges substantially in great circles correspondingly intersecting at the respective poles, said strips thereby forming substantially similar patterns about the polar areas of the ball, vulcanizing the fabric reinforced bladder to predetermined spherical size in a mold, and vulcanizing a rubber cover onto the fabric reinforced bladder 12. An athletic ball comprising an inflatable spherical casing including a ply of rubberized fabric attached to the casing and reinforced by a network of separate strips of rubberized fabric attached to the casing, said separate strips extending completely around the spherical casing in separate series of great circles crossing each other at oppositely disposed poles of the casing, the polar axes of each of said separate series being arranged at angles to each other whereby said strips form substantially similar patterns at oppositely disposed polar areas of the casing.

13. An athletic ball comprising an inflatable spherical casing including a plurality of plies of rubberized fabric attached to the casing and reinforced by a network of separate strips of rubberized fabric attached to the casing, said separate strips extending completely around the spherical casing in separate series of great circles crossing each other at oppositely disposed poles of the casing, the polar axes of each of said separate series being arranged at right angles to each other whereby said strips form substantially similar patterns at oppositely disposed polar areas of the casing.

14. An athletic ball comprising an inflatable spherical casing of rubber or like flexible resilient material having three plies of bias-cut fabric attached thereto, each of said plies being composed of spheroid-shaped segments with adjacent edges abutting, the abutting edges of the segments of the respective plies extending around the casing to define great circles intersecting at opposite poles thereof, strips of reinforcing fabric being extended in great circles over the abutting edges of said segments of each ply and being adhered to said casing, the strips of each ply forming separate series crossing each other at opposite poles, and the plies and strips of each series being arranged so that the polar axes thereof are at angles to each other, whereby said strips form substantially similar patterns of reinforcing members about opposite polar areas of the casing.

15. An athletic ball comprising an inflatable casing of rubber or like flexible resilient material having attached therein a plurality of plies of bias-cut rubberized fabric, said plies being composed of segments having adjacent edges in abutting relation, and separate strips of bias-cut rubberized fabric extended completely around said casing and being attached to the plies of fabric, said strips thereby forming a network of pressure restraining reinforcing members throughout said casing.

16. An athletic ball comprising an inflatable spherical casing of rubber or like flexible resilient material having three plies of bias-cut rubberized fabric attached thereto, each of said plies being composed of spheroid-shaped segments with adjacent edges abutting, said abutting edges of the respective plies extending around the casing to define great circles intersecting at opposite poles thereof, strips of rubberized reinforcing fabric being extended in great circles over the abutting edges of said segments of each ply and being attached to said casing, the strips of each ply forming separate series crossing each other at opposite poles, and the plies and strips of each series being arranged so that the polar axes thereof are at right angles to each other, whereby said strips form substantially similar patterns of reinforcing members about opposite polar areas of the casing.

17. A method of making an inflatable athletic ball, which comprises forming an inflated spherical body, attaching a plurality of separate reinforcing strips to said body, to extend in great circles completely around said body to resist expansion of the ball under inflation thereof, and vulcanizing the ball in a mold under internal pressure.

18. An athletic ball comprising an inflatable hollow body of rubber or like material reinforced by a network of separate strips of reinforcing material attached to the body, said separate strips extending completely around the body in separate series of great circles crossing each other at oppositely disposed poles of the body, the polar axes of each of said separate series being arranged at angles to each other whereby said strips form substantially similar patterns at oppositely disposed poles.

19. An athletic ball comprising an inflatable casing of rubber or like flexible resilient material having attached thereto at least one ply of reinforcing fabric material, said fabric ply being composed of segments having adjacent edges in abutting relation, and separate strips of reinforcing material attached to said casing and extending completely around the same, said strips thereby forming a network of pressure restraining reinforcing members throughout said casing.

20. A method of making an inflatable athletic ball which comprises forming an inflated hollow rubber body, applying a plurality of separate strips of rubber or like impregnated fabric to said body to extend completely around the same to resist expansion thereof under inflation pressure, vulcanizing said body in a mold, and adhering a cover of abrasion resisting material to said body.

THOMAS W. SMITH, JR.